United States Patent [19]

Divisek et al.

[11] 4,394,244

[45] Jul. 19, 1983

[54] DIAPHRAGMS FOR ALKALINE WATER ELECTROLYSIS AND METHOD FOR PRODUCTION OF THE SAME AS WELL AS UTILIZATION THEREOF

[75] Inventors: Jiri Divisek; Jürgen Mergel, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 166,448

[22] Filed: Jul. 7, 1980

[30] Foreign Application Priority Data

Jul. 7, 1979 [DE] Fed. Rep. of Germany ....... 2927566

[51] Int. Cl.³ ............................................ C25B 13/04
[52] U.S. Cl. .................................... 204/295; 204/282
[58] Field of Search ................ 204/295, 296, 286, 282

[56] References Cited

U.S. PATENT DOCUMENTS 3,216,919 11/1965 White et al. ........................ 204/258
3,222,265 12/1965 Beer ................................. 204/295 X

FOREIGN PATENT DOCUMENTS

| | | |
|---|---|---|
| 396994 | 6/1924 | Fed. Rep. of Germany . |
| 632494 | 7/1936 | Fed. Rep. of Germany . |
| 1144237 | 2/1963 | Fed. Rep. of Germany ...... 204/295 |
| 1294941 | 5/1969 | Fed. Rep. of Germany . |
| 1571419 | 6/1970 | Fed. Rep. of Germany . |
| 1817719 | 7/1970 | Fed. Rep. of Germany . |
| 1958385 | 9/1970 | Fed. Rep. of Germany . |
| 2132786 | 1/1973 | Fed. Rep. of Germany . |
| 2239658 | 2/1973 | Fed. Rep. of Germany . |
| 2315526 | 10/1973 | Fed. Rep. of Germany . |
| 2161898 | 7/1976 | Fed. Rep. of Germany . |
| 2737041 | 3/1978 | Fed. Rep. of Germany . |
| 2329770 | 5/1977 | France . |
| 2357663 | 2/1978 | France . |
| 2397471 | 2/1979 | France . |
| 48-5040473 | 1/1973 | Japan ................................. 204/295 |
| 2010333 | 6/1979 | United Kingdom . |

OTHER PUBLICATIONS

Aktuelle Wissenschaft, p. 5, Jul. 1979.
Hydrogen Manufacture by Electrolysis, Thermal Decomp and Unusual Tech. by Casper, published by Noyes Data, Park Ridge, N.Y., (1979).
Hydrogen Energy System, vol. 1, pp. 241-245, 250, 251 by Veziroglu et al.
Int'l. Society Electochem. Budapest, (1978), pp. 71, 72 by Fischer et al.

*Primary Examiner*—F. Edmundson
*Attorney, Agent, or Firm*—Becker & Becker, Inc.

[57] ABSTRACT

A diaphragm of porous sinter material for alkaline water electrolysis characterized by a porous sinter metal oxidized at least partially to metal oxide. A frame structure of the sinter body is provided especially wire net. The base metal of the sinter body is formed by nickel, iron or copper. The method includes forming a porous metal sinter body and oxidizing the same at elevated temperature in oxygen-containing atmosphere. The method for production of nickel oxide diaphragms furthermore includes applying to a nickel net a pasty mass of nickel powder containing a binder and burning. Applying in a thin layer as by brushing nickel powder of a particle size of about 1 to 10 mm in a rubber solution in toluene upon a carrier, especially a nickel net, and this arrangement is subjected to sintering at 700° to 1,000° C. for a time or duration of 10 to 20 minutes in inert or reducing atmosphere especially in hydrogen and the sinter body which is obtained is subjected to roasting in air at 1000° C. to 1200° C. up to three hours, especially for a time duration in a range of between ten and forty minutes. The diaphragms are produced with a thickness in a range of approximately 1 mm, especially in a range of approximately 0.3 mm to 0.7 mm. Utilization of the diaphragm includes electrolysis cells with active porous nickel electrode fixed on the diaphragm in a sandwich manner of construction.

12 Claims, 1 Drawing Figure

DIAPHRAGMS FOR ALKALINE WATER ELECTROLYSIS AND METHOD FOR PRODUCTION OF THE SAME AS WELL AS UTILIZATION THEREOF

The present invention relates to a diaphragm for alkaline water electrolysis of porous sinter material as well as a method for production of the same and utilization thereof.

With the selection of the electrolytes for the technical water electrolysis, the corrosion of the electrodes and the cell has a decisive and important role to play. Since acids in spite of the very good electrical conductivity particularly because of this corrosion danger do not come into consideration, exclusively alkaline electrolytes are utilized. Of these, there is preferred a potassium hydroxide or potash lye of approximately 30% because of the high electrical conductivity. In practice, operation occurs at operating temperatures of approximately 80° C.

Actually, an operation at even higher temperatures would be appropriate for a lowest possible and consequently energy-saving electrolysis cell voltage; the limited temperature resistance or stability of the generally utilized diaphragm material, asbestos, however, represents a considerable hindrance in a hot potassium hydroxide or potash lye. The relatively poor mechanical stability of asbestos is a further disadvantage; this makes necessary large wall thickness of approximately 2 mm for the asbestos diaphragm from which a voltage drop results leading to further energy losses.

Especially in most recent time, many attempts were made accordingly to replace asbestos as the diaphragm material. The best and most well-known example is the diaphragm of Teflon-bound potassiumhexatitanate ($K_2Ti_6O_{13}$)-felt developed by Energy Research Corporation can be noted which is stabile and durable up to 150° C. The voltage drop required by this diaphragm is however comparable with that of the asbestos diaphragms (see also: M. S. Casper: "Hydrogen Manufacture by Electrolysis, Thermal Decomposition and Unusual Techniques", NOYES DATA CORP., Park Ridge, 1978, Page 190).

Further proposed was the utilization of porous metallic diaphragms of sintered nickel (P. Perroud and G. Terrier: Hydrogen Energy System, Proceedings of the 2nd World Hydrogen Energy Conference, Zürich, 1978, Page 241). These porous dividing or separating membranes can deliver excellent values for the electrical resistance of the enclosed electrolyte. Additionally, these porous dividing or separating membranes are mechanically very stabile and advantageous from a price standpoint. The great disadvantage exists however therein that these diaphragms conduct electrons like the electrodes and with a compact manner of construction, there exists a short-circuit danger which is too great.

Only the resistance-data and corrosion-data are known about a recently mentioned diaphragm (J. Fischer, H. Hofman, G. Luft, H. Wendt: Extended Abstracts, ISE-Meeting, Budapest 1978, Page 71). The authors make no statements about the production type or composition of their diaphragm. According to a notice in "Bild der Wissenschaft 1979" (Picture of Science or Learning) Issue 7, Page 5, this diaphragm is to provide a nickel net as a carrier for porous, sintered oxide ceramic material. Presumably with the oxide ceramic, there is involved the above mentioned hexatitanate which was already taken into consideration as a diaphragm material and connected with the nickel net in a manner not mentioned in greater detail. The production not yet described makes the post-working of such diaphragms impossible.

Accordingly, an object of the present invention is to create a diaphragm for alkaline water electrolysis which is temperature-resistant and corrosion-resistant, not having any electron conducting capability of its own, having sufficient mechanical stability and for these reasons also capable of being built in such a thin layer that a very good electrical conductivity of the enclosed electrolyte can be guaranteed. Furthermore, this diaphragm is to be capable of being produced of inexpensive materials and according to a simple method.

This object, and other objects and advantages of the present invention will appear more clearly from the following specification in connection with the accompanying drawing, in which FIG. 1 schematically shows an electrolysis unit in accordance with the present invention.

This object is resolved according to the invention by a diaphragm of sinter material which is characterized by a porous sinter metal oxidized at least partially to metal oxide.

Such a diaphragm according to the invention is obtained thereby that first a porous, metallic diaphragm is produced according to a method suitable for this purpose and this diaphragm in a further method step is oxidized so far to metal oxide in oxygen-containing atmosphere subject to maintaining the diaphragm structure so that an electrical resistance sufficient for the utilization results having a value of for example at least approximately 1 k $\Omega$.

For the generation of the sinter body there is proceeded preferably on the basis of a framework structure as for example a relatively fine wire net which is coated with pasted-on powder material and then is subjected to a sinter treatment.

For example, nickel, iron or copper come into consideration as base metals. The production of an especially interesting diaphragm upon a nickel base can occur for example proceeding upon a nickel net with a mesh width in a magnitude of 100 $\mu$m to 500 $\mu$m which is coated with nickel powder having a granular size in the range of a few $\mu$m. The sintering of the powder mass occurs in an inert or reducing atmosphere, especially in hydrogen, at approximately 700° C. to 1000° C. for 10 minutes to 20 minutes. In this manner, there is obtained a porous body of which the porosity lies in the range of up to 90%. A sintering time or duration that is too high would be disadvantageous for the desired high porosity of the sinter body.

The sinter body so obtained is burned in air at 1000° C. to 1200° C. up to three hours, particularly 10 to 40 minutes long (respectively according to the diaphragm thickness which lies in a range of 0.3 mm to 0.7 mm).

In this manner, there is attained a sufficient oxidation of the body which is compatible with the desired characteristics.

According to the method described by the foregoing, large surface diaphragms can be produced without difficulty having characteristics particularly adapted to utilization in electrolysis cells. Particularly, a product is obtained by the oxidation of the porous sinter body which is not too far oxidized having a sufficient strength characteristic provided by the metallic residue structure though possessing a sufficient electric resistance extending over the entire body from the surface by way of the progressing oxide formation, such sufficient electrical resistance also permitting a problemless operation in narrow cells.

The electrical resistance attained by oxidation from the surface characteristic for the product permits particularly a compact manner of construction of electrolysis units with which the diaphragm is coated with electrode layers on both sides like a sandwich. The application of these electrodes fixed on the diaphragm itself can occur in any manner suitable for this purpose; particularly, however, an electrolytic deposit respectively of one electrode layer on both sides of the diaphragm is preferred and especially a nickel/zinc alloy is deposited which subsequently is activated by dissolving out zinc. Such a nickel/zinc deposit with subsequent activation by dissolving-out of zinc is described for example in U.S. patent application Ser. No. 134,756 belonging to the Assignee of the present invention, reference being made thereto hereby.

EXAMPLE 1

Production of a Diaphragm

First, a porous metal sinter body was produced: a nickel powder mass was pasted with a rubber solution in toluene (methylbenzene) as a binding medium upon a nickel net (mesh width 0.25 mm, wire strength or thickness 0.35 mm), such nickel powder mass being applied respectively brushed in an entire quantity of 50 mg/cm$^2$ on both sides of the net carrier as a nickel powder layer. The utilized INCO-nickel powder type 255 had a particle size of 2.3 $\mu$m to 3 $\mu$m. After 15 minutes sintering under hydrogen at 800° C. there was obtained a metal sinter body 0.5 mm thick with 90% porosity. 80% of the pores were smaller than 10 $\mu$m.

According to this simple method, suitably large surface sinter bodies can be produced with measurements which are limited only by the furnace. The electrical resistance of these metal sinter bodies lies at a few or several m$\Omega$.

Thereafter the sinter body is roasted or calcined for 20 minutes at 1200° C. in air. Geometry and structure under these circumstances are maintained in essence and the mechanical stability was sufficient for installation in an electrolysis cell. The electrical resistance increased to 10 M$\Omega$.

Corrosion tests were carried out with this metal oxide diaphragm. The relative corrosion disintegration or diminution in size in 40% potassium hydroxide or potash lye at 120° C. after 1000 hours lay at 1.9% of the entire weight. Also thereafter the electric resistance remained unchanged in the M$\Omega$-range. The typical specific surface resistance in 7 n KOH at 20° C. amounted to 0.120 $\Omega$ cm$^2$. This excellent value naturally is still smaller at the operating or working temperature (approximately 120° C.). The diaphragm is suitable also for alkaline water electrolysis which occurs in the melt as could be proved by a corresponding corrosion test.

For this purpose, the diaphragm was dipped for a duration of 500 hours in a NaOH:LiOH (1:1) melt of 400° C. with 0.5% moisture. According to this currentless corrosion test there was not determined or established any weight change.

EXAMPLE 2

Production of a Diaphragm Coated with Electrodes

A diaphragm produced as in Example 1 was coated galvanically with a nickel/zinc alloy (65% Ni, 35% Zn) on both sides in the manner described by U.S. application Ser. No. 134,756 belonging to the assignee of the present invention. The three-layer or triple-layer unit of diaphragm with alloy layering or coating on both sides obtained in this manner was electrically contacted laterally with two iron grilles and was activated by dissolving-out zinc in a hot potassium hydroxide or potash lye.

In this manner, there was obtained a compact unit for the water electrolysis which was tested at 120° C. in 45% potassium hydroxide or potash lye and which delivered the following electrolysis data:

| Current Density | 100 $\frac{mA}{cm^2}$ | 200 $\frac{mA}{cm^2}$ | 300 $\frac{mA}{cm^2}$ | 400 $\frac{mA}{cm^2}$ |
|---|---|---|---|---|
| Cell Voltage | 1.44 V | 1.52 V | 1.61 V | 1.67 V |

The accompanying FIG. 1 shows schematically the construction of such an electrolysis unit. The illustration of FIG. 1 includes a showing of current supplies laterally outwardly from porous electrodes applied on both sides of a centrally located NiO diaphragm.

In summary, the present invention provides a diaphragm for alkaline water electrolysis of porous sinter material characterized by a porous sinter metal oxidized at least partially to metal oxide. The diaphragm generally indicated by the numeral 10 includes a framework structure of the sintered body particularly of wire net 12. The base metal of the sinter body is formed by nickel, iron or copper.

The method for production of a diaphragm according to the foregoing characteristics includes forming a porous metal sinter body and oxidizing the same at an elevated temperature in an oxygen-containing atmosphere. The method is further characterized thereby that the sinter body is produced by application of a nickel-powder mass mixed with alcohol or made pasty especially with binding means such as a rubber or methylcellulose solution upon a nickel net and subsequent sintering and burning thereof, the alcohol containing powder mass would be sprayed upon the grid and compacted by slight compression at about 200 KP per square cm followed by sintering. More specifically, there is applying or brushing of a nickel powder provided with a rubber solution in toluene (methylbenzene) as a binding medium with the nickel powder having a particle size of approximately 1 $\mu$m to 10 $\mu$m, particularly or especially in a range of 2 $\mu$m to 3 $\mu$m in a thin layer upon a carrier, especially a nickel net, and then this arrangement is subjected to sintering at 700° C. to 1,000° C. for a time or duration of 10 minutes to 20 minutes in an inert or reducing atmosphere especially in hydrogen and the resulting sinter body is roasted up to three hours, particularly for a duration or time ranging between ten minutes to forty minutes in air at 1000° C. to 1200° C. In accordance with the method there is producing of the diaphragms with a thickness of approximately up to 1 mm, especially in a range of approximately 0.3 to 0.7 mm.

DESCRIPTION OF THE DRAWINGS

The diaphragm of the present invention is particularly adapted for utilization for electrolysis cells with an active porous nickel electrode means fixed on the diaphragm 10 in a sandwich-construction manner illustrated in FIG. 1.

Figure 1:
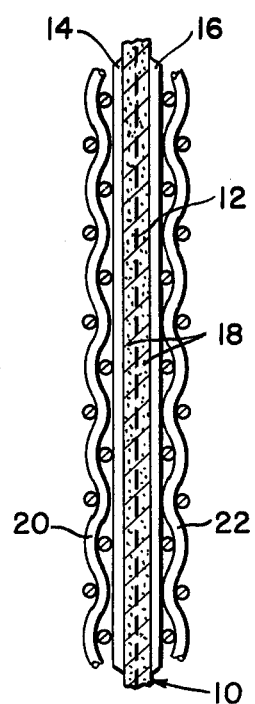
FIG. 1 shows the porous Ni-electrodes 14 and 16 applied on opposite sides of the wire net 12 having sintered porous material 18 coated thereon, with current supply means 20 and 22 in the form of a screen or metal grille being shown on laterally opposite sides or surfaces of the diaphragm configuration in accordance with the present invention.

The present invention is, of course, in no way restricted to the specific disclosure of the specification and drawing, but also encompasses any modifications within the scope of the appended claims.

What we claim is:

1. A diaphragm for alkaline water electrolysis and made of a porous sinter material, comprising a porous sinter metal oxidized at least partially to metal oxide of partial oxidation in structure thereof, the partial oxidation penetrating the whole structure resulting in a sufficiently isolating but mechanically consistent body.

2. A diaphragm according to claim 1, comprising a sinter body comprising a frame structure of a wire net covered with nickel powder mass.

3. A diaphragm according to claim 2, in which said sinter body is formed of a base metal which is one from a group consisting of nickel, iron or copper.

4. A diaphragm according to claim 3, comprising active porous nickel electrodes means fixed on the diaphragm in a sandwich manner of construction for electrolysis cells.

5. A diaphragm for alkaline water electrolysis, comprising:
   a metal frame oxidized at least partially to metal oxide, and
   a layer of sintered nickel formed from sintered nickel powder covering the frame completely to form a diaphram which is at least partially oxidized throughout and which is mechanically rigid and electrically insulated.

6. The diaphragm according to claim 5 wherein the metal frame is made of nickel.

7. The diaphragm according to claim 5 wherein the frame is configured as a nickel net.

8. The diaphragm of claim 7 wherein the nickel powder has a particle size in a range of approximately 1 um to 10 um and is deposited in a thin layer upon the nickel net, using a rubber solution in toluene as a binding medium; wherein the powder and net are sintered in a temperature range between 700° C. to 1000° C. for a time duration in the range of 10 minutes to 40 minutes in an inert or reducing atmosphere, and wherein the resulting sinter body is heated up to three hours in air at a temperature ranging between 1000° C. to 1200° C.

9. The diaphragm according to claim 8 wherein the nickel powder has a particle size in a range between 2 um to 3 um.

10. The diaphragm according to claim 9 in which said sintering occurs in hydrogen and said heating is effected during a time interval ranging between 10 minutes to 20 minutes.

11. The diaphragm according to claim 7 wherein the diaphragm has a thickness up to approximately 1 mm.

12. The diaphragm of claim 7 wherein the diaphragm has a thickness in the range of 0.3 mm to 0.7 mm.

* * * * *